United States Patent
Tillotson (10) Patent No.: US 7,750,593 B2
(45) Date of Patent: Jul. 6, 2010

(54) ACTIVE HUMAN-MACHINE INTERFACE SYSTEM WITHOUT A FORCE SENSOR

(75) Inventor: John K. Tillotson, Petoskey, MI (US)

(73) Assignee: Honeywell International Inc., Morristown, NJ (US)

( * ) Notice: Subject to any disclaimer, the term of this patent is extended or adjusted under 35 U.S.C. 154(b) by 486 days.

(21) Appl. No.: 11/760,023

(22) Filed: Jun. 8, 2007

(65) Prior Publication Data

US 2008/0100252 A1 May 1, 2008

Related U.S. Application Data

(60) Provisional application No. 60/859,389, filed on Nov. 14, 2006, provisional application No. 60/854,764, filed on Oct. 26, 2006.

(51) Int. Cl.
*G05B 5/01* (2006.01)

(52) U.S. Cl. .............. 318/611; 318/628; 318/568.11; 345/156; 345/161

(58) Field of Classification Search ........... 318/567, 318/628, 630, 632, 568.11; 345/156, 161, 345/166; 700/85
See application file for complete search history.

(56) References Cited

U.S. PATENT DOCUMENTS

| | | | |
|---|---|---|---|
| 4,236,685 A | | 12/1980 | Kissel |
| 5,543,698 A | * | 8/1996 | Tao et al. ............... 318/611 |
| 5,629,594 A | * | 5/1997 | Jacobus et al. ......... 318/568.11 |
| 5,691,898 A | * | 11/1997 | Rosenberg et al. ........... 700/85 |
| 5,731,804 A | * | 3/1998 | Rosenberg ............... 345/156 |
| 5,734,373 A | * | 3/1998 | Rosenberg et al. .......... 345/161 |
| 5,828,197 A | * | 10/1998 | Martin et al. ............. 318/567 |
| 5,831,408 A | * | 11/1998 | Jacobus et al. ......... 318/568.11 |
| 5,907,487 A | * | 5/1999 | Rosenberg et al. ........... 700/85 |
| 6,067,077 A | | 5/2000 | Martin et al. |
| 6,227,066 B1 | | 5/2001 | Stachniak |

(Continued)

FOREIGN PATENT DOCUMENTS

EP 1628176 A2 2/2006

OTHER PUBLICATIONS

Flight Deck Controls: Side Stick Controls. MPC Passive Side-Stick Controllers and Active Side-Stick Controllers [online]. [retrieved on Feb. 20, 2007]. Retrieved from Internet: <URL: www.mpcproducts.com/flightdeck_sidestick.asp>.

*Primary Examiner*—Paul Ip
(74) *Attorney, Agent, or Firm*—Ingrassia Fisher & Lorenz, P.C.

(57) ABSTRACT

An active human-machine interface system is implemented without a force sensor. The system includes a user interface that is configured to receive user input and, upon receipt thereof, to move to a position. A position sensor is coupled to the user interface and is operable to sense user interface position and supply a position signal representative thereof. A motor is coupled to the user interface and to receive motor current. In response to the motor current the motor supplies a feedback force to the user interface at a magnitude proportional to the motor current. A control circuit is coupled to receive at least the position signal and a signal representative of the motor current and controls the motor current supplied to the motor.

15 Claims, 4 Drawing Sheets

U.S. PATENT DOCUMENTS

| | | | |
|---|---|---|---|
| 6,283,859 B1 | 9/2001 | Carlson et al. | |
| 6,339,419 B1 | 1/2002 | Jolly et al. | |
| 6,373,465 B2 | 4/2002 | Jolly et al. | |
| 6,512,509 B1 | 1/2003 | McVicar | |
| 6,886,819 B2 | 5/2005 | Kintz et al. | |
| 7,209,117 B2 * | 4/2007 | Rosenberg et al. | 345/156 |
| 7,299,321 B2 * | 11/2007 | Braun et al. | 711/154 |
| 7,345,672 B2 * | 3/2008 | Jacobus et al. | 345/156 |
| 7,394,173 B2 * | 7/2008 | Cope et al. | 310/15 |
| 7,439,951 B2 * | 10/2008 | Rosenberg et al. | 345/156 |
| 7,605,800 B2 * | 10/2009 | Rosenberg | 345/156 |
| 2001/0002126 A1 * | 5/2001 | Rosenberg et al. | 345/156 |
| 2001/0030658 A1 * | 10/2001 | Rosenberg et al. | 345/701 |
| 2001/0045941 A1 * | 11/2001 | Rosenberg et al. | 345/161 |
| 2002/0033841 A1 * | 3/2002 | Rosenberg | 345/701 |
| 2002/0095224 A1 * | 7/2002 | Braun et al. | 700/44 |
| 2002/0126091 A1 * | 9/2002 | Rosenberg et al. | 345/161 |
| 2003/0030621 A1 * | 2/2003 | Rosenberg et al. | 345/156 |
| 2003/0193475 A1 * | 10/2003 | Rosenberg et al. | 345/156 |
| 2004/0100440 A1 | 5/2004 | Levin et al. | |
| 2004/0104924 A1 * | 6/2004 | Braun et al. | 345/701 |
| 2004/0164959 A1 | 8/2004 | Rosenberg et al. | |
| 2005/0080495 A1 | 4/2005 | Tessier et al. | |
| 2005/0173595 A1 | 8/2005 | Hoh | |
| 2005/0195168 A1 * | 9/2005 | Rosenberg et al. | 345/161 |
| 2005/0219206 A1 * | 10/2005 | Schena et al. | 345/156 |
| 2005/0234607 A1 | 10/2005 | Cartmell et al. | |
| 2006/0007184 A1 * | 1/2006 | Rosenberg et al. | 345/173 |
| 2006/0066269 A1 | 3/2006 | Lumley et al. | |
| 2006/0187197 A1 * | 8/2006 | Peshkin et al. | 345/156 |
| 2007/0139375 A1 * | 6/2007 | Rosenberg et al. | 345/161 |
| 2007/0298877 A1 * | 12/2007 | Rosenberg | 463/30 |
| 2008/0007517 A9 * | 1/2008 | Peshkin et al. | 345/156 |
| 2008/0100252 A1 * | 5/2008 | Tillotson | 318/628 |
| 2008/0303789 A1 * | 12/2008 | Braun et al. | 345/156 |

* cited by examiner

ACTIVE HUMAN-MACHINE INTERFACE SYSTEM WITHOUT A FORCE SENSOR

CROSS-REFERENCES TO RELATED APPLICATIONS

This application claims the benefit of U.S. Provisional Application No. 60/859,389, filed Nov. 14, 2006, and U.S. Provisional Application No. 60/854,764 filed Oct. 26, 2006.

TECHNICAL FIELD

The present invention relates to human-machine interfaces and, more particularly, to a human-machine interface system that provides haptic feedback to a user and that does not require a force sensor.

BACKGROUND

Human-machine interfaces that are used to translate human movements to machine movements are used in myriad industries. For example, some aircraft flight control systems include a human-machine interface in the form of one or more control sticks, pedals, or other controls. The flight control system, in response to input forces supplied to the interface(s) from the pilot, controls the movements of various aircraft flight control surfaces. No matter the particular end-use system, the human-machine interface preferably includes some type of haptic feedback mechanism back through the interface to the interface operator.

Many haptic feedback mechanisms are implemented using a force sensor as the primary input device to the feedback loop. In most instances, the force sensor drives a servo amplifier, which in turn drives a motor. The motor, which is coupled to the human-machine interface via a gearbox, supplies a feedback force to the human-machine interface. Although these types of haptic feedback mechanisms are generally safe and reliable, they do suffer certain drawbacks. For example, the force sensor (or sensors) increases overall system cost and complexity. When redundancy is employed to increase overall system reliability, the system cost and complexity can be significant.

In addition to increased costs, the force sensor many times senses undesired high frequency vibratory force inputs from the human hand. These force inputs, when sensed, may be amplified, and tuning the feedback loop to reject these vibratory force inputs can adversely impact system characteristics. Moreover, the servo feedback loop can be difficult to tune for acceptable feel because of the high gain associated with a force sensor, and because the motor may be separated from the force sensor by the gearbox. As a result, in some designs additional sensors are used to sense motor velocity and/or angular acceleration, further adding to costs. The servo feedback loop typically needs relatively high mechanical stiffness to implement a relatively high performance servo loop, which further increase cost and weight. Additionally, the force sensor may detect accelerations and some systems require auxiliary accelerometers to counteract the unwanted inputs.

BRIEF SUMMARY

In one embodiment, and by way of example only, an active human-machine interface system includes a user interface, a position sensor, a motor, and a control unit. The user interface is configured to receive user input and, upon receipt thereof, to move to a position. The position sensor is coupled to the user interface and is operable to sense user interface position and supply a position signal representative thereof. The motor is coupled to the user interface and to receive motor current and is operable, upon receipt thereof, to supply a feedback force to the user interface at a magnitude proportional to the motor current. The control circuit is coupled to receive at least the position signal and a signal representative of the motor current and is operable, in response to at least these signals, to control the motor current supplied to the motor.

In another exemplary embodiment, an active human-machine interface system includes a user interface, a motor, a rotor position sensor, a user interface position sensor, and a control circuit. The user interface is configured to receive user input and, upon receipt thereof, to move to a position. The motor includes a rotor and a stator. The rotor is coupled to the user interface, and the stator is coupled to receive motor current. The motor is operable, in response to the motor current supplied to the stator, to supply a feedback force to the user interface at a magnitude proportional to the motor current. The rotor position sensor is coupled to the motor rotor and is operable to supply a rotor position signal representative thereof. The user interface position sensor is coupled between the user interface and the motor and is operable to sense user interface position and supply a user interface position signal representative thereof. The control circuit is coupled to receive at least the rotor position signal, the user interface position signal, and a signal representative of the motor current and is operable, in response to at least these signals, to control the motor current supplied to the motor stator.

In still another exemplary embodiment, an active human-machine interface system includes a user interface, a position sensor, a controlled device, a motor, and a control circuit. The user interface is configured to receive user input and, upon receipt thereof, to move to a position. The position sensor is coupled to the user interface and is operable to supply a position signal representative thereof. The controlled device is coupled to receive the position signal and is operable, in response thereto, to move to a commanded position. The motor is coupled to the user interface and to receive motor current and is operable, upon receipt thereof, to supply a feedback force to the user interface at a magnitude proportional to the motor current. The control circuit is coupled to receive the position signal, a signal representative of the motor current, and a sensed parameter associated with the controlled device and is operable, in response to at least these signals, to control the motor current supplied to the motor.

Other independent features and advantages of the preferred active human-machine interface system will become apparent from the following detailed description, taken in conjunction with the accompanying drawings which illustrate, by way of example, the principles of the invention.

DETAILED DESCRIPTION OF PREFERRED EMBODIMENTS

The following detailed description is merely exemplary in nature and is not intended to limit the invention or the application and uses of the invention. Furthermore, there is no intention to be bound by any theory presented in the preceding background or the following detailed description. In this regard, although the following description is, for convenience, directed to a system implemented with a user interface that is configured as a control stick, it will be appreciated that the system could be implemented with variously configured user interfaces including, for example, variously configured pedals, yokes, levers, and the like.

Figure 1:
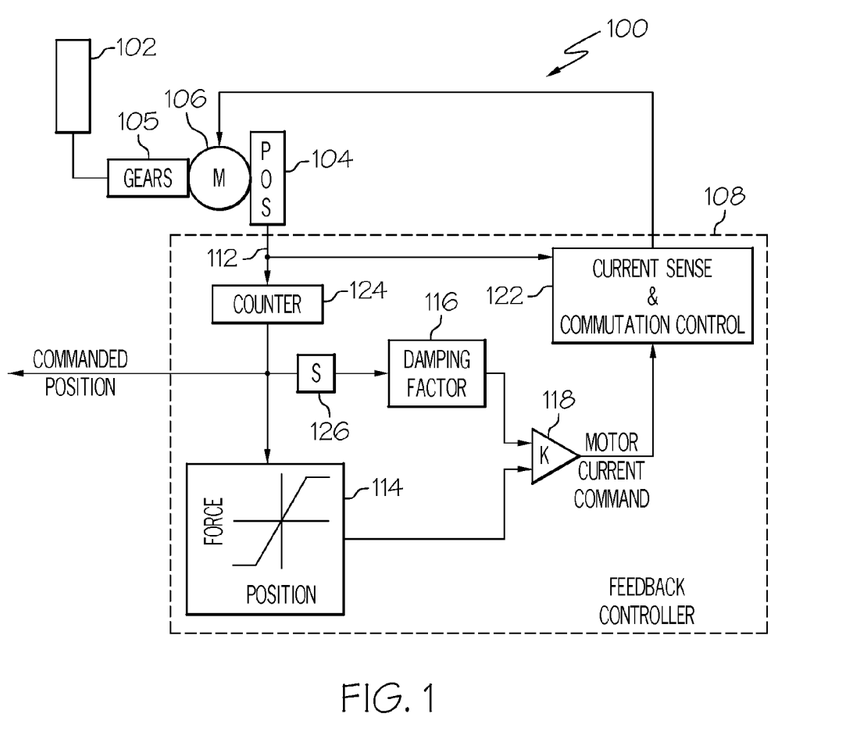
FIG. 1 is a functional block diagram of an active human machine interface system according to one embodiment of the present invention.
Figure 2:
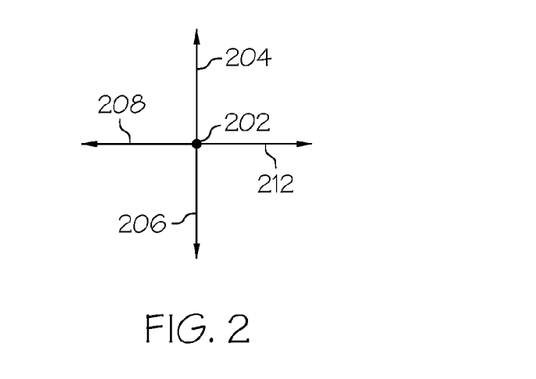
FIG. 2 depicts various movements of a user interface that is used to implement the system of FIG. 1.

Turning first to FIG. 1, an exemplary embodiment of an active human-machine interface system 100 is depicted. The system 100 includes a user interface 102, one or more position sensors 104, a motor 106, and a control circuit 108. The user interface 102 may be implemented according to any one of numerous configurations. In the depicted embodiment, however, it is implemented as a control stick that is preferably dimensioned to be grasped by a hand. As FIG. 2 depicts, the user interface 102 is further configured to be movable, from a null position 202, in a plurality of directions. For example, the user interface 102 is movable in a forward direction 204, a backward direction 206, a left direction 208, a right direction 212, a combined forward-left direction, a combined forward-right direction, a combined backward-left direction, or a combined backward-right direction, and back to or through the null position 202.

Returning to FIG. 1, the position sensor 104 is coupled to, and senses the position of, the user interface 102, and supplies a position signal 112 representative thereof. The position signal is supplied to the control circuit 108 and may, in some embodiments, be supplied to a non-illustrated external device or system. The external device or system is responsive to the position command to move one or more devices to the commanded position, or to cause one or more devices to move to the commanded position. The control circuit 108, as will be described further below, responds to the position command to appropriately control current to the motor 106. The position sensor 104 may be implemented using any one of numerous types of suitable position sensing devices, and may be coupled to the user interface 102 using any one of numerous techniques. In the depicted embodiment, the position sensor 104 is depicted as a single device, but may be implemented as two or more sensors. Preferably, the position sensor(s) 104 is(are) also configured to sense the motor rotational position, the purpose of which is described further below. If two sensors are used, one sensor may be used to coarsely sense absolute motor rotational position during startup. Then, after some initial movement, a high resolution sensor, such as an incremental encoder, may be used to provide more precise commutation. Various types of position sensors, including resolvers, Hall sensors, optical encoders, RVDTs, etc. may be used to sense both user interface position and motor rotational position.

Figure 3:
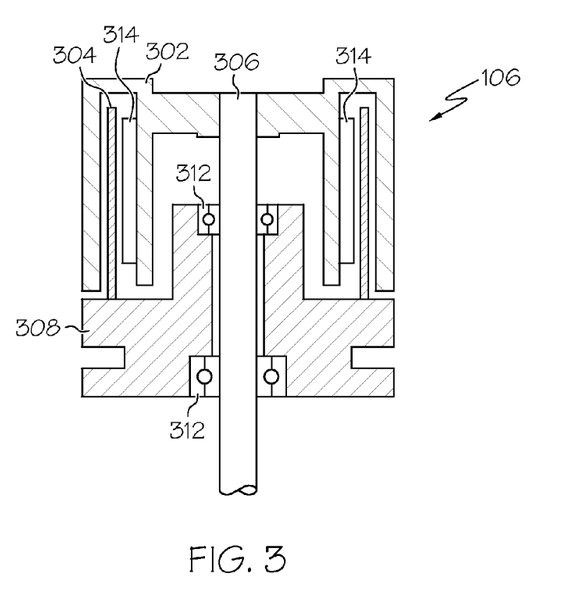
FIG. 3 is a cross section view of an exemplary slotless brushless motor that may be used to implement the system of FIG. 1.

The motor 106 may be implemented using any one of numerous types of motors, now known or developed in the future, but is preferably implemented as a brushless motor. Most preferably, the motor 106 is implemented as a cogless (or slotless) brushless motor. A slotless brushless motor does not exhibit the same torque ripple effects as slotted motors. Additionally, the motor 106 needs a highly predictable current versus torque relationship, and a relatively high torque to inertia ratio. Although any one of numerous types of motors exist, in a particular embodiment a slotless brushless motor developed and sold by ThinGap Corporation may be used. An embodiment of an exemplary slotless motor is depicted in FIG. 3 and, for completeness, will be briefly described.

The motor 106 includes a rotor 302 and a stator 304. The rotor 302 is coupled to a shaft 306 that is rotationally mounted on a support structure 308 via a plurality of bearing assemblies 312. The rotor 302 is preferably constructed, at least in part, of a ferromagnetic material, and has a plurality of permanent magnets 314 coupled thereto. The rotor 302 at least partially surrounds, and is spaced apart from, the stator 304.

The stator 304 includes one or more coils that are not wound within teeth of a lamination structure. This may be implemented using any one of numerous known configurations. In the depicted embodiment, however, the stator 304 is implemented as a freestanding coil made of a copper sheet and glass-fiber composite. The stator 304 is coupled to receive current from, for example, the control circuit 108 that generates a rotating magnetic field with the stator 304. The rotor 302, in response to the rotating magnetic field, rotates and supplies a feedback force, via the shaft 306, to the user interface 102.

Returning once again to FIG. 1, no matter the particular brand of motor 106 that is used, the motor 106 is coupled to the user interface 102 via a gear set 105. Although the gear set may be implemented using any one of numerous types and configurations of gears, in a particular preferred embodiment the gear set 105 is implemented using a low loss, single pass gear set having a relatively low gear ratio.

The motor current supplied to the motor 106 is controlled, as noted above, by the control circuit 108. The control circuit 108 includes a force versus position determination function 114, a damping factor function 116, a motor current command function 118, and a commutation control function 122. The force versus position determination function 114 receives a signal representative of the commanded position and, in response thereto, supplies a force feedback signal representative of the desired feedback force to be supplied to the user interface 102. The force versus position determination function 114 may include simulations of fixed or variable springs, breakouts, tactile cues, or other haptic information, as may be needed or desired. The force versus position determination function 114 may additionally be implemented using any one of numerous analog or digital circuit configurations now known or developed in the future. In those embodiments in which the position signal supplied from the position sensor 104 may not be representative of absolute position, the position signal 112 supplied from the position sensor 104 is first supplied to a counter 124. The counter 124, based on the position signal from the position sensor 104, supplies a signal representative of the absolute position of the motor rotor and, thus, the user interface 102.

The position signal from the counter 124 is supplied to the damping factor function 116, via a differentiator 126, and may also be supplied to the previously mentioned external device or system. The differentiator 126 differentiates the positions signal, and supplies a velocity signal representative of the rate of change of position to the damping factor function 116. The damping factor function 116, in response to the velocity signal, determines and supplies a signal representative of a damping factor to appropriately dampen the system 100. The differentiator 126 and damping factor function 116 may also be implemented using any one of numerous known analog and/or digital circuits or circuit devices.

The force versus position determination function 114 and the damping factor function 116 are both coupled to the motor current command function 118. The motor current command function 118, based on the signals supplied from the force versus position determination function 114 and the damping factor function 116, supplies a motor current command signal to the commutation control function 122. The motor current command signal is representative of the motor current to be supplied to the motor 106.

The commutation control function 122 is configured to properly commutate the motor 106. In the depicted embodiment, the commutation control function 122 is implemented as a current sense and commutation control function and as such will be referred to user this nomenclature for the remainder of the description. It will be appreciated, however, that the commutation control function 122 need not sense current, but could be implemented in an open loop configuration that precisely controls duty cycles to achieve semi-precise application of current to the motor 106. Moreover, although any one of numerous commutation schemes may be used, in a particular preferred embodiment the current sense and commutation control function 122 implements a non-trapezoidal commutation scheme, such as sine commutation. Numerous devices to perform commutation are commercially available. One particular embodiment uses model ACP-090-36, which is a device sold by Copley Controls Corporation. As FIG. 1 depicts, the current sense and commutation control function 122 receives the position signal supplied from the position sensor 104 and the motor current command signal from the motor current command function 118 and, in response, supplies the current to the motor 106 to thereby control the torque feedback supplied to the user interface 102. Preferably, the current sense and commutation control function 122 senses the current supplied to the motor 106 to provide more accurate current generation and control to the motor 106.

The system of FIG. 1 may be used to supply position control commands to any one of numerous external devices, and to supply force feedback to the user interface 102 based on the commanded or actual position. The system may also be implemented in any one of numerous environments, and suitably modified, if needed, to meet certain requirements of the environment. For example, the system may be implemented in an aircraft environment, and used to control the position of various aircraft flight control surfaces. Such an implementation is depicted in FIG. 4, and with reference thereto will now be described.

Figure 4:
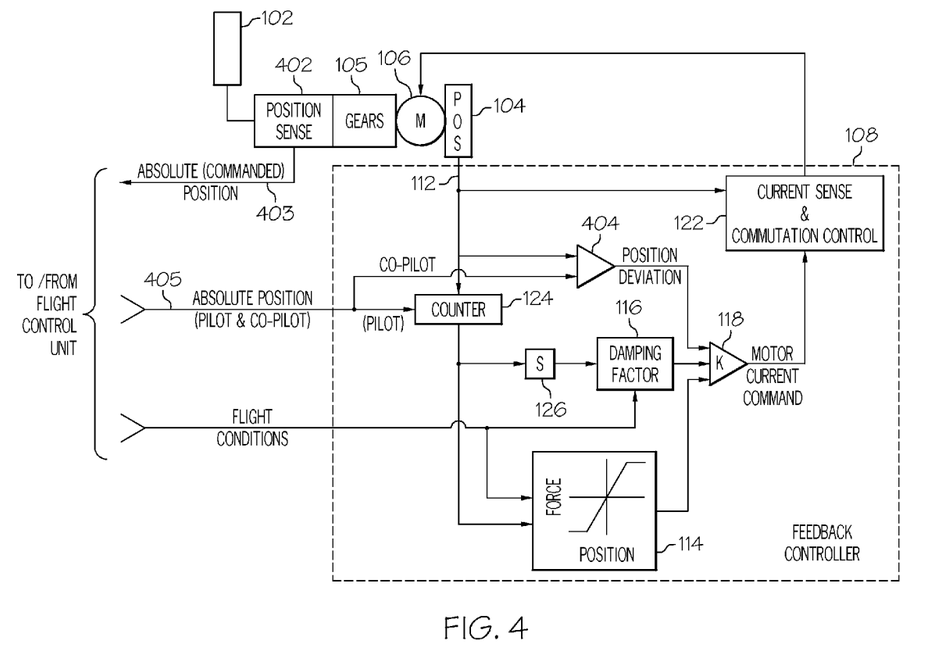
FIGS. 4-6 are each functional block diagrams of active human machine interface systems according to exemplary alternative embodiments.

The system 400 depicted in FIG. 4 is substantially similar to that of FIG. 1 and, as such, like reference numerals used in FIG. 4 refer to like components, parts, devices, or circuits of FIG. 1 and will not be further described. In addition to the like components, parts, devices, or circuits of FIG. 1, the system 400 depicted in FIG. 4 includes an absolute position sensor 402, and a position deviation determination function 404. The absolute position sensor 402 is coupled between the user interface 102 and the gear set 105, and is used to sense the absolute position of the user interface 102 and provide an absolute position signal 403 representative thereof. The absolute position signal 403 is supplied to, for example, a non-illustrated flight computer, which samples the signal. The flight computer also preferably supplies a signal 405 representative of the depicted user interface 102 and that of another user interface, such as a co-pilot's user interface (not depicted) to the counter 124. The counter 124, at least in the depicted embodiment, compares the absolute position signal 405 to the position signal 112 supplied from the motor position sensor 104, to ensure the motor position accurately represents that of the user interface 102.

The counter 124, in addition to supplying the signal representative of the absolute position of the motor rotor to the damping factor function 116 and the force versus position determination function 114, also supplies this signal to the position deviation determination function 404. The position deviation function 404 also receives a signal representative of the co-pilot's user interface. The position deviation function 404 determines whether there is a deviation between the two user interfaces and, if there is, supplies a signal representative thereof to the motor current command function 118.

The force versus position determination function 114, as in the embodiment depicted in FIG. 1, receives a signal representative of the commanded position. However, it additionally receives one or more signals representative of flight conditions from, for example, the non-illustrated flight control unit. It will be appreciated that one or more other sources could supply one or more of the flight condition signals in addition to or instead of the flight control unit. In either case, the force versus position determination function, in response to the commanded position signal and the flight condition signals, supplies a force feedback signal to the motor current command function 118 that is representative of the desired feedback force to be supplied to the user interface 102.

The motor current command function 118, based on the signals supplied from the force versus position determination function 114, the damping factor function 116, and the position deviation determination function 404, supplies a motor current command signal to the current sense and commutation control function 122. The motor current command signal is representative of the motor current to be supplied to the motor 106.

The current sense and commutation control function 122 is preferably configured identically, or at least substantially identically to the previously described embodiments. As such, further description of this function is not deemed warranted.

Figure 5:
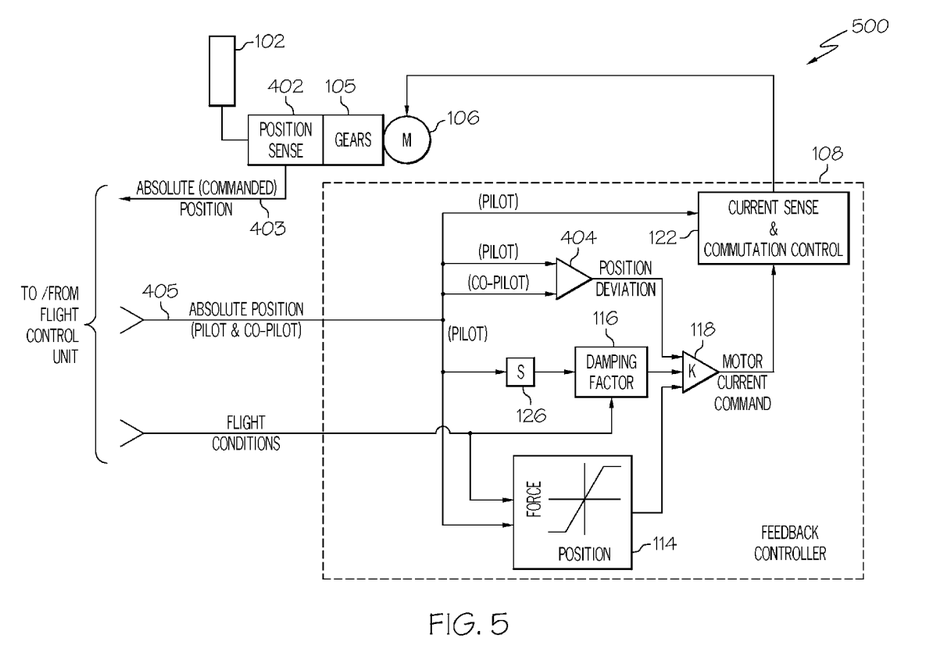

In another embodiment, which is depicted in FIG. 5, the system 500 is configured substantially similar to that of FIG. 4 and, as such, like reference numerals used in FIG. 5 refer to like components, parts, devices, or circuits of FIG. 4 and will not be further described. The major difference between the embodiments of FIGS. 4 and 5 is that the system 500 in FIG. 5 does not include the motor position sensor 104 and the counter 124. Instead, the absolute position sensor 402 is used to supply all of the position signals, and thus the absolute position signal 403 is supplied, either directly or indirectly, to the force versus position determination function 114, the current sense and commutation control function 122, the differentiator 126, and the position deviation function 404. For example, in the embodiment depicted in FIG. 5, the absolute position signal 403 is supplied to these functions 114, 122, 126, 404 indirectly, via the non-illustrated flight computer. Alternatively, the absolute position signal 403 could be supplied directly to one or more of these functions 114, 122, 126, 404 without first being transmitted to the flight computer.

Figure 6:
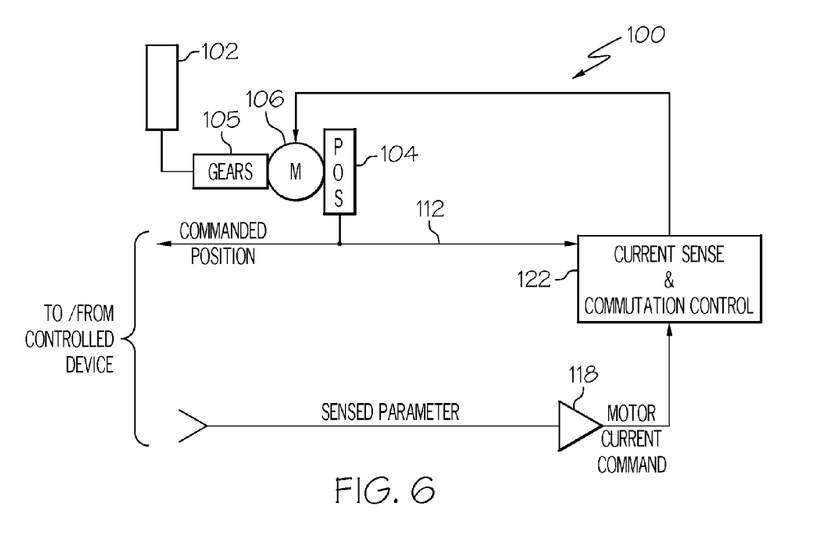

In yet another embodiment, which is depicted in FIG. 6, the commanded position from the position sensor 104 is supplied to a non-illustrated controlled device, and the device supplies a signal representative of a measured parameter to the motor current command function. The controlled device may be any one of numerous devices, and the measured parameter may also be varied. For example, the controlled device may be a remotely controlled scalpel, and the measured parameter may be a force sensed at the tip of the scalpel. In such an embodiment, the haptic feedback supplied to an operator of the user interface 102 would be based on the measured force.

In each of the above-described embodiments, it will be appreciated that the motor, gear set, position sensor, and control circuit are shown for only one axis of rotation of the user interface, and that these would be reproduced in the other axis of rotation. It will additionally be appreciated that each of the above-described embodiments could be modified in various ways. For example, the system in FIG. 1 and could be modified such that the position sensor 104 is disposed between the user interface 102 and the gear set 105, and the system of FIG. 4 could be modified such that the position sensor 104 is not included at all. In each of these alternative embodiments, the sensor disposed between the user interface 102 and the gear set 105 is used to sense both absolute position of the user interface 102 and to supply a position signal to the current sense and commutation control function 122 for use in motor commutation. It will be appreciated that in these alternative embodiments, the current sense and commutation control function 122, or a separate function, accounts for the gear set 105.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention.

What is claimed is:

1. An active human-machine interface system, comprising:
    a user interface configured to receive user input and, upon receipt thereof, to move to a position;
    a position sensor coupled to the user interface, the position sensor operable to sense user interface position and supply a position signal representative thereof;
    a motor coupled to the user interface, the motor further coupled to receive motor current and operable, upon receipt thereof, to supply a feedback force to the user interface at a magnitude proportional to the motor current; and
    a control circuit configured to control the motor current supplied to the motor, the control circuit comprising:
        a counter coupled to receive the position signal and operable, in response thereto, to supply an absolute position signal representative of user interface absolute position,
        a force versus position determination function coupled to receive the absolute position signal and operable, in response thereto, to supply a force feedback signal representative of the feedback force,
        a differentiator coupled to receive the absolute position signal and operable, in response thereto, to supply a velocity signal representative of a rate of change of the absolute position,
        a damping factor function coupled to receive the velocity signal and operable, in response thereto, to supply a damping factor signal representative of a damping factor,
        a motor current command function coupled to receive the force feedback signal and the damping factor signal and operable, in response thereto, to supply a motor current command signal, and
        a commutation control function coupled to receive (i) the position signal, (ii) the signal representative of the motor current, and (iii) the motor current command signal and operable, in response thereto, to supply the motor current to the motor.

2. The system of claim 1, wherein:
    the motor comprises a stator and a rotor, the rotor coupled to the user interface; and
    the position sensor is coupled to the motor rotor, whereby the position signal is further representative of the motor rotor position.

3. The system of claim 1, wherein the commutation control function implements a non-trapezoidal motor commutation scheme.

4. The system of claim 3, wherein the non-trapezoidal motor commutation scheme is a sine commutation scheme.

5. The system of claim 1, wherein:
    the system is adapted for use in an aircraft; and
    the force versus position determination function is further coupled to receive a signal representative of aircraft flight conditions and is further responsive thereto to supply the force feedback signal.

6. The system of claim 5, wherein the damping factor function is further coupled to receive the signal representative of aircraft flight conditions and is further responsive thereto to supply the damping factor signal.

7. The system of claim 1, wherein the user interface is a first user interface, the position signal is a first position signal, and wherein the control circuit further comprises:
    a position deviation determination function coupled to receive (i) the first position signal and (ii) a second position signal that is representative of a second user interface position, the position determination function operable, in response to the first position signal and the second position signal, to supply a position deviation signal representative of a deviation between the first and second user interface positions.

8. The system of claim 7, wherein the motor current command function is coupled to receive the position deviation signal and is further responsive thereto to supply the motor current command signal.

9. The system of claim 1, wherein:
    the position signal is further representative of a position command, the position command representative of a desired position of a controlled device; and
    the control circuit is adapted to receive a signal representative of a sensed parameter associated with the controlled device and is further operable, in response to this signal, to control the motor current supplied to the motor.

10. The system of claim 1, further comprising:
    a gear set coupled between the motor and the user interface.

11. The system of claim 10, further comprising:
    an absolute position sensor coupled between the user interface and the gear set and operable, to sense absolute user interface position and supply an absolute position signal representative thereof.

12. An active human-machine interface system, comprising:
    a user interface configured to receive user input and, upon receipt thereof, to move to a position;
    a motor including a rotor and a stator, the rotor coupled to the user interface, the stator coupled to receive motor current, the motor operable, in response to the motor current supplied to the stator, to supply a feedback force to the user interface at a magnitude proportional to the motor current;

a user interface position sensor coupled between the user interface and the motor and operable, to sense user interface position and supply a user interface position signal representative thereof;

a rotor position sensor coupled to the motor rotor and operable to supply a rotor position signal representative thereof; and a control circuit configured to control the motor current supplied to the motor stator, the control circuit comprising:

a counter coupled to receive the rotor position signal and operable, in response thereto, to supply an absolute position signal representative of user interface absolute position; and     a force versus position determination function coupled to receive the absolute position signal and operable, in response thereto, to supply a force feedback signal;

a differentiator coupled to receive the absolute position signal and operable, in response thereto, to supply a velocity signal representative of a rate of change of the absolute position;

a damping factor function coupled to receive the velocity signal and operable, in response thereto, to supply a damping factor signal;

a motor current command function coupled to receive (i) the force feedback signal and (ii) the damping factor signal and operable, in response thereto, to supply a motor current command signal; and     a current sense and commutation control function coupled to receive (i) the user interface position signal, (ii) the absolute position signal, (iii) the signal representative of the motor current, and (iv) the motor current command signal and operable, in response thereto, to supply the motor current to the motor stator.

13. The system of claim 12, wherein:

the system is adapted for use in an aircraft; and the force versus position determination function is further coupled to receive a signal representative of aircraft flight conditions and is further responsive thereto to supply the force feedback signal.

14. The system of claim 13, wherein the damping factor is further coupled to receive the signal representative of aircraft flight conditions and is further responsive thereto to supply the damping factor signal.

15. The system of claim 13, wherein the user interface is a first user interface, the user interface position signal is a first user interface position signal, and wherein the control circuit further comprises:

a position deviation determination function coupled to receive (i) the first user interface position signal and (ii) a second user interface position signal that is representative of a second user interface position, the position determination function operable, in response to the first and second user interface position signals, to supply a position deviation signal representative of a deviation between the first and second user interface positions, wherein the motor current command function is coupled to receive the position deviation signal and is further responsive thereto to supply the motor current command signal.

* * * * *